United States Patent
Arlt et al.

(10) Patent No.: US 8,459,009 B2
(45) Date of Patent: Jun. 11, 2013

(54) METHOD AND DEVICE FOR CONTROLLING AN SCR-EXHAUST GAS AFTER-TREATMENT SYSTEM OF AN INTERNAL COMBUSTION ENGINE

(75) Inventors: Tino Arlt, Regensburg (DE); Peter Bauer, Immenreuth (DE); Joris Fokkelman, Tegernheim (DE); Ingo Koops, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 200 days.

(21) Appl. No.: 12/709,996

(22) Filed: Feb. 22, 2010

(65) Prior Publication Data

US 2010/0218484 A1  Sep. 2, 2010

(30) Foreign Application Priority Data

Feb. 27, 2009 (DE) .................. 10 2009 010 888

(51) Int. Cl.
*F01N 3/20* (2006.01)
(52) U.S. Cl.
USPC ............ 60/286; 60/274; 60/277; 60/295; 60/301; 60/303
(58) Field of Classification Search
USPC .............. 60/274, 277, 286, 295, 301, 303
See application file for complete search history.

(56) References Cited

U.S. PATENT DOCUMENTS

| 4,630,027 | A | * | 12/1986 | Muhlberger et al. ...... 340/457.4 |
| 6,063,350 | A | * | 5/2000 | Tarabulski et al. ......... 423/239.1 |
| 6,119,448 | A | * | 9/2000 | Emmerling et al. ............ 60/274 |
| 7,028,465 | B2 | | 4/2006 | Ripper et al. ................... 60/286 |
| 2003/0033799 | A1 | | 2/2003 | Scheying ........................ 60/286 |
| 2008/0022658 | A1 | * | 1/2008 | Viola et al. ...................... 60/286 |
| 2008/0178575 | A1 | * | 7/2008 | Shaikh et al. ................... 60/274 |
| 2009/0293451 | A1 | * | 12/2009 | Kesse ............................. 60/274 |
| 2010/0089037 | A1 | * | 4/2010 | Bogema et al. ................. 60/286 |
| 2010/0101214 | A1 | * | 4/2010 | Herman et al. ................. 60/277 |
| 2010/0154386 | A1 | * | 6/2010 | Perrin et al. .................... 60/277 |

FOREIGN PATENT DOCUMENTS

| DE | 10100420 | 7/2002 |
| DE | 10139142 | 2/2003 |

OTHER PUBLICATIONS

German Office Action for Application No. 10 2009 010 888.2 (6 pages).

* cited by examiner

*Primary Examiner* — Thomas Denion
*Assistant Examiner* — Jorge Leon, Jr
(74) *Attorney, Agent, or Firm* — King & Spalding L.L.P.

(57) ABSTRACT

A method for controlling an SCR-exhaust gas after-treatment system (1) of an internal combustion engine (8), in particular of an internal combustion engine of a motor vehicle, has one or more steps for determining the quality of the reducing means.

14 Claims, 1 Drawing Sheet

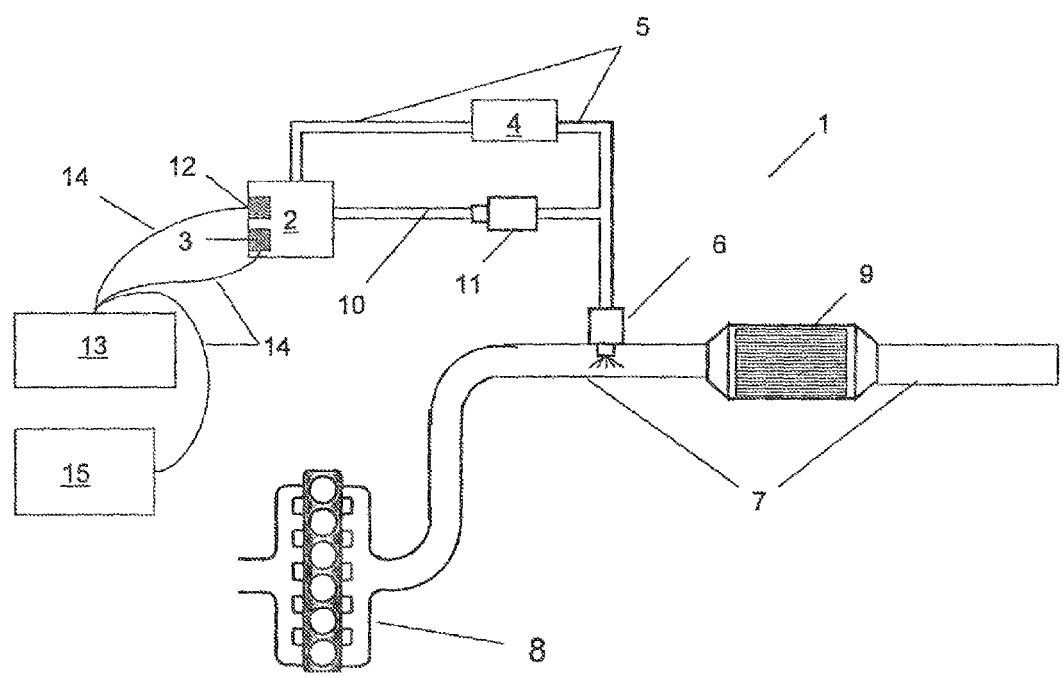

METHOD AND DEVICE FOR CONTROLLING AN SCR-EXHAUST GAS AFTER-TREATMENT SYSTEM OF AN INTERNAL COMBUSTION ENGINE

CROSS-REFERENCE TO RELATED APPLICATIONS

This application claims priority to DE Patent Application No. 10 2009 010 888.2 filed Feb. 27, 2009, the contents of which is incorporated herein by reference in its entirety

TECHNICAL FIELD

The invention relates to a method and a device for controlling an SCR-exhaust gas after-treatment system of an internal combustion engine, in particular of an internal combustion engine of a motor vehicle.

BACKGROUND

The tightening of standards for exhaust gas components for motor vehicles worldwide and the further tightening as a result of emissions regulations not only requires a considerable reduction in engine emissions but also makes an extremely efficient exhaust gas treatment imperative.

SCR-technology, in particular, is becoming increasingly important for reducing nitrogen oxide. In these methods, which are already established, nitrogen oxide (NOx) contained in the oxygen-rich exhaust gas is reduced by means of ammonia. Preferably, in this connection precursor substances are drawn upon, in particular aqueous urea solutions which may be converted to ammonia. A high-purity eutectic solution of 32.5% urea in deionized water is marketed, for example, under the brand name AdBlue. The urea solution is hydrolized by means of hydrolyzing catalysts or directly on the SCR-catalyst to form ammonia and carbon dioxide. To this end, the urea solution is injected from an auxiliary reservoir in the vehicle into the exhaust gas flow by means of special metering systems upstream of the hydrolysis catalyst or the SCR-catalyst. The nitrogen oxide is then converted in the SCR-catalyst into nitrogen and water vapor. In this connection, there is the problem of ensuring a metering of the reducing agent which is as accurate as possible.

If correct and reliable metering is not ensured, an efficient removal of nitrogen oxide from the exhaust gas may not be achieved. An overdosage of reducing agent, on the other hand, may result in an undesired emission of ammonia, for example, a so-called break-through of reducing agent.

With liquid reducing agents, such as conventional urea solutions, the metering may take place by means of an injector. The activation time and thus the opening time of the injector, therefore, have an effect, amongst others, on the quantity of reducing agent supplied to the exhaust gas after-treatment system.

The AdBlue, which is preferably used as a reducing agent solution, generally has a high degree of purity and quality in accordance with DIN standard 70070 and the German Standard ISO 22241-1:2006(E). AdBlue, however, is liable to gradual decomposition and is only able to be stored for a limited time. During storage, it is converted into ammonia and carbon dioxide and may be concentrated in open systems by evaporation of the water component. The aqueous urea solution may then no longer fulfill the requirements of the aforementioned standards. At a storage temperature of 25° C. maximum, for example, the quality requirements for AdBlue are intended to be ensured for at least 6 months after its manufacture. If the recommended storage temperature is, however, exceeded, said time period is shortened. Thus the quality of the reducing agent is also fundamentally important when a requirement is determined for efficient removal of nitrogen oxide in the SCR-exhaust gas after-treatment system. In previously known exhaust gas after-treatment methods, the deviation in the quality of the reducing agent which may occur is, however, not taken into account as a factor influencing the determination of the requirement.

In DE 101 00 420 A1, for example, a method for controlling an exhaust gas after-treatment system for an internal combustion engine is disclosed, in which a predeterminable amount of reducing agent is supplied depending on the state of the internal combustion engine or the exhaust gas after-treatment system. The quantity of reducing agent supplied is thus varied according to the nitrogen oxide conversion of the SCR-catalyst depending on the detection of an overdosage and/or underdosage of the reducing agent. The method is complicated and dependent on many parameters, both of the internal combustion engine and the entire exhaust gas after-treatment system. In this exhaust gas after-treatment system and method, no allowances at all are made for the possible occurrence of decomposition or decrease in concentration of the reducing agent solution.

In previously known SCR-exhaust gas after-treatment systems, when calculating a requirement for the reducing agent and ultimately the metering thereof into the exhaust gas, a uniform quality, in particular a uniform concentration, is assumed. If the quality of the reducing agent is altered by one or more influencing factors, this may lead to a significant loss of efficiency of the SCR-catalyst.

SUMMARY

According to various embodiments, a simple and cost-effective method for controlling an SCR-exhaust gas after-treatment system of an internal combustion engine, in particular of an internal combustion engine of a motor vehicle, can be provided by which the required metering of the reducing agent may be ensured and the efficiency of the nitrogen oxide removal may be improved.

According to an embodiment, a method for controlling an SCR-exhaust gas after-treatment system of an internal combustion engine, in particular of an internal combustion engine of a motor vehicle, comprising at least one reservoir for a reducing agent, a reducing agent pump, reducing agent lines and a metering device, may comprise one or more steps for determining the quality of the reducing agent.

According to a further embodiment, the determination of the quality of the reducing agent for the SCR-exhaust gas after-treatment system of an internal combustion engine may comprise the following steps: a) determining the service life of the internal combustion engine and of the reducing agent stored in the reservoir transmitting the service life information to a diagnostics system, c) evaluating the service life information by means of the diagnostics system and d) displaying the evaluation result by means of a display device and/or transmitting a control signal to the reducing agent metering device. According to a further embodiment, in addition to the service life in step a), the filling level of the reducing agent in the reservoir can be determined and steps b) to d) additionally include the filling level information. According to a further embodiment, in step a) additionally the ambient temperature can be measured and steps b) to d) additionally include the ambient temperature information. According to yet a further embodiment, the ambient temperature can be measured over the entire service life of the internal combustion engine. According to yet a further embodiment, the temperature of the reducing agent in the reservoir can be measured and steps b) to d) include this temperature information of the reducing means. According to a further embodiment, reducing agent supplied from the reservoir into the SCR-exhaust gas after-treatment system can be returned via a return line into the reservoir and the heating of the stored reducing agent, which possibly occurs as a result, can be detected and steps b) to d) further include this temperature information of the reducing agent.

According to another embodiment, a device for carrying out a method as described above may comprise means for determining the quality of the reducing agent for the SCR-exhaust gas after-treatment of an internal combustion engine.

According to a further embodiment, the means may comprise a CAN-bus system for transmitting the service life of the internal combustion engine, the filling level, the temperature information of the reducing agent and/or the ambient temperature to a diagnostics system. According to a further embodiment, the diagnostics system can be integrated in an SCR-control unit. According to a further embodiment, the device can be part of an on-board diagnostics system.

According to yet another embodiment, an SCR-exhaust gas after-treatment system for an internal combustion engine, in particular of a motor vehicle, may comprise a device as described above.

BRIEF DESCRIPTION OF THE DRAWINGS

The invention is explained hereinafter by way of example in combination with the drawings, without being limited to this embodiment.

FIG. 1 shows a schematic view of an embodiment of a device for carrying out a method for controlling an SCR-exhaust gas after-treatment system.

DETAILED DESCRIPTION

According to various embodiments, it is proposed to provide a method for controlling an SCR-exhaust gas after-treatment system of an internal combustion engine, in particular of an internal combustion engine of a motor vehicle, comprising at least one reservoir for a reducing agent, a reducing agent pump, reducing agent lines and a metering device, in which one or more steps for determining the quality of the reducing agent are carried out.

In other words, according to various embodiments, one or more influencing factors may be determined which may affect the quality of the reducing agent. The term "reducing agent" is understood to mean the material composition or the precursor substance thereof, which is stored in the reservoir and from which the actual reducing agent for the SCR-catalyst is provided and/or released. In particular, this may be the 32.5% aqueous urea solution (AdBlue) preferably used for the SCR-catalyst which is converted by thermohydrolysis into the actual reducing agent, ammonia.

The phrase "determining the quality of the reducing agent" is understood, according to the invention, to mean that a possible occurrence of a deviation from the desired composition of the reducing agent may be determined. In particular, an alteration in the concentration of reducing agent, which has an effect on the quantity of reducing agent metered into the exhaust gas line, is encompassed in determining the quality according to various embodiments. Such an alteration may, for example, result from decomposition reactions or decrease in concentration by evaporation. According to various embodiments, the determined deviation in the composition may influence the determination of the requirement for the quantity of reducing agent for the SCR-catalyst. Thus, advantageously, the exact dose of the reducing agent may be ensured by a corresponding adaptation of the metered quantity of reducing agent and the efficiency of the nitrogen oxide removal improved.

The method according to various embodiments may be advantageously designed as part of an on-board diagnostics system in a motor vehicle. As a result, an operator, for example the driver of a motor vehicle, may be made aware of the variations in the quality of the reducing agent and requested to replace the reducing agent.

In an embodiment of the method, for determining the quality of the composition of the reducing agent for an SCR-exhaust gas after-treatment system of an internal combustion engine, in particular of an internal combustion engine, the following steps may be carried out:

a) determining the service life of the internal combustion engine and the composition of the reducing agent stored in a reservoir, b) transmitting the service life information to a diagnostics system, c) evaluating the service life information by means of the diagnostics system and d) displaying the evaluation results by means of a display device and/or transmitting a signal to the reducing agent-metering device.

In modern motor vehicles, detecting and displaying current data in the display instrument in the cockpit is standard. This data information may be transmitted in step b), for example via a CAN-bus system, to a diagnostics system which, for example, may be incorporated in an SCR-control unit and stored there in a memory when the vehicle is switched off. Other data transmission systems which are already established, such as for example FlexRay or LIN-systems, may also be used for transmitting the data in step b). When starting up the vehicle again, this data information may be recalled and by comparing with the currently detected data information, the service life of the vehicle may be determined. It is, therefore, generally possible for the service life of the internal combustion engine to be identical with the service life of the composition of the reducing agent in the reservoir. The service life information may be utilized and by comparing with characteristic values stored in the SCR-control device, conclusions may be drawn about the quality of the reducing agent. After this evaluation, in step d) the result may be displayed, for example, in a display in the vehicle cockpit and/or indicated to an operator by an acoustic signal. Additionally or alternatively, moreover, a control signal may be sent to the metering device, so that a metering into the exhaust gas may be achieved directly and automatically adapted to the altered quality of reducing agent. As a result, a reliable and efficient removal of nitrogen oxide may also be ensured over a longer time period and the efficiency of the SCR-catalyst improved.

Advantageously, in the method according to various embodiments, a diagnosis may take place as to whether the quality of the reducing agent, in particular the concentration of the reducing agent available, could possibly be altered by means, which are already present and only slightly adapted, of an SCR-exhaust gas after-treatment system of an internal combustion engine, in particular of an internal combustion engine in a motor vehicle. In this manner, the requirement for the reducing agent used may be determined in a markedly more accurate manner, and even when the composition of the reducing agent is altered an efficient nitrogen oxide removal may be ensured.

In a further variant of the method, in addition to the service life in step a), the filling level of the reducing agent in the reservoir may be determined, steps b) to d) then additionally including the filling level information. The measurement of the filling level may be carried out by a tank level sensor. Advantageously, known tank level sensors such as economic threshold value switches or even continuously measuring sensors may be used, which are already used as standard for detecting the filling level of liquids and/or gases in reservoirs, for example of fuel. One advantage is that by means of this measure, for example, it is possible to monitor whether during the service life fresh reducing agent has been poured into the reservoir.

In a further method, in step a) the ambient temperature may be additionally measured, steps b) to d) additionally then being able to include the ambient temperature information. The temperature may advantageously be detected very easily and cost-effectively using already known temperature sensors. A detection and display of the ambient temperature again forms part of the standard equipment in modern motor vehicles.

According to various embodiments, the ambient temperature may also be denoted as the outside temperature.

Preferably, the ambient temperature may be measured over the entire service life of the internal combustion engine. In this connection, the temperature measurement may also be carried out so that a measurement takes place continuously or only when reaching specific threshold value temperatures, for example when exceeding 25° C. or 30° C.

This has the advantage that, by taking into account the ambient temperature over the entire duration of the service life, even more accurate conclusions may be made about the quality of the composition of the reducing agent. As a result, in turn an accurate metering of the reducing agent may be advantageously carried out.

In a further development of the method, it may be provided alternatively or additionally to the previously known measurements in step a) that the temperature of the composition of the reducing agent in the reservoir is measured and steps b) to d) include this temperature information of the reducing agent. Known temperature sensors may be used for measuring the temperature of the reducing agent. By means of this simple and reliable measure, advantageously the determination of the quality of the composition of the reducing agent and the efficiency of the nitrogen oxide removal may be further improved.

In a further embodiment, reducing agent which has already been supplied from the reservoir into the SCR-exhaust gas after-treatment system, i.e. into the reducing agent lines, may be returned via a return line into the reservoir. The heating of the stored reducing agent, which possibly occurs as a result, may be detected according to an embodiment, steps b) to d) thus further including this temperature info nation of the reducing agent. In particular, when the filling level of the reducing agent in the reservoir is low, a temperature increase due to the returned reducing agent may result in a considerably accelerated decomposition of the reducing agent. This heating due to returned reducing agent may, however, be advantageously detected by the method and taken into account when determining the quality and requirement of the reducing agent. Moreover, the metering may be adjusted accurately and a reliable and efficient nitrogen oxide removal may be ensured.

According to other embodiments, a device may carry out the above-disclosed method. This device may comprise means for determining the quality of the reducing agent for the SCR-exhaust gas after-treatment of an internal combustion engine.

In an embodiment, the means may comprise a CAN-bus system for transmitting the service life of the internal combustion engine, the filling level, the temperature information of the reducing agent and/or the ambient temperature to a diagnostics system.

In a further embodiment, the diagnostics system may be integrated in an SCR-control unit. According to various embodiments, however, the diagnostics system may also be integrated, for example, in another control unit already present in a motor vehicle, for example the control unit of the display instrument in the cockpit or the engine management system. As a result, a separate, additional diagnostics system or control device may be dispensed with. According to various embodiments, cabling, wiring, for example for signal transmission, and/or a connected sensor system which are already present, may also be used for the method.

The device according to various embodiments may advantageously be part of an on-board diagnostics system in a motor vehicle.

The FIGURE shows a schematic view of an SCR-exhaust gas after-treatment system 1 for carrying out the method according to various embodiments. The SCR-system shown 1 contains a reservoir 2 for the reducing agent medium. A temperature sensor 3 may be arranged on or in the tank 2, by which the temperature of the reducing agent may be detected. A reducing agent pump 4 is arranged in the reducing agent line 5. The reducing agent line 5 serves for supplying reducing agent fluid from the reservoir 2 to a metering device 6. The metering device 6 may be any device which is able to regulate the supply of reducing agent solution into the exhaust gas line 7 of an internal combustion engine 8, for example an internal combustion engine of a motor vehicle. The metering device 6 may be an injector and is arranged upstream of an SCR-catalyst 9 in the exhaust gas line 7. By means of a return line 10 arranged upstream of the metering device 6, with a valve 11 incorporated therein, in the embodiment shown the reducing agent fluid may be passed back into the reservoir 2. The valve 11 is opened expediently in the return line 10 in the direction of the reducing agent tank 2. Moreover a tank level sensor 12 may be arranged on the reducing agent tank 2, by which the filling level of the reducing agent in the reservoir 2 may be detected. The tank level sensor 12 may be a continuously measuring sensor or a more economical threshold value switch. The SCR-exhaust gas after-treatment system 1 may further be connected to a time detection device, for example in the SCR-control unit 13 in a motor vehicle via cables 14 of a CAN-bus system. The diagnostics system may be advantageously incorporated in the SCR-control unit 13. Via the CAN-bus system 14, the time, temperature and filling level information determined according to various embodiments may be subsequently transmitted to the display instrument 15. After the diagnosis has been carried out, therefore, the result of the evaluation of the detected values and data may be transmitted by an optical or acoustic display to an operator, that may indicate a replacement of the reducing agent is required. Alternatively or additionally, a control signal may be transmitted to the metering device 6 and thus an adaptation of the metered quantity of the reducing agent may be implemented directly and automatically.

In summary, by means of the various embodiments an improved method for controlling an SCR-exhaust gas after-treatment system is accordingly available, in which by only slightly adapted means of an SCR-exhaust gas after-treatment system, in particular in a motor vehicle, an accurate metering of the reducing agent may be carried out according to requirements, even when the composition of the reducing agent deviates from the desired composition. According to various embodiments, therefore, the efficiency of the nitrogen oxide removal may be increased in a simple manner.

What is claimed is:

1. A method for controlling an SCR-exhaust gas after treatment system of an internal combustion engine comprising at least one reservoir for a reducing agent, a reducing agent pump, reducing agent lines and a metering device, the method comprising:
   determining a service life of the engine using a time detection device;
   determining a quality of the reducing agent based on the determined service life of the engine, the determined quality of the reducing agent indicating a possibly occurring deviation from a desired composition of the reducing agent;
   selectively adapting a metered quantity of the reducing agent based on the determined quality of the reducing agent; and
   removing nitrogen oxide using the adapted metered quantity.

2. The method according to claim 1, comprising determining the quality of the reducing agent based at least on (a) the determined service life of the engine and (b) a detected fill level of the reducing agent in the at least one reservoir.

3. The method according to claim 1, comprising determining the quality of the reducing agent based at least on (a) the determined service life of the engine and (b) a series of ambient temperature measurements taken over the service life of the engine.

4. The method according to claim 1, comprising determining the quality of the reducing agent based at least on (a) the determined service life of the engine and (b) a measured temperature of the reducing agent in the at least one reservoir.

5. The method according to claim 1, further comprising:
   returning reducing agent supplied from the reservoir into the SCR-exhaust gas after-treatment system via a return line into the at least one reservoir;
   detecting a heating of the stored reducing agent resulting from the return of the reducing agent into the at least one reservoir; and
   determining the quality of the reducing agent based at least on (a) the determined service life of the engine and (b) the detected heating of the reducing agent.

6. A device for controlling an SCR-exhaust gas after-treatment system of an internal combustion engine using a reducing agent, the device comprising:
   a control system configured to:
      determine a service life of the engine using a time detection device;
      determine a quality of the reducing agent based on the determined service life of the engine, the determined quality of the reducing agent indicating a possibly occurring deviation from a desired composition of the reducing agent; and
   a metering device configured to:
      selectively adapt a metered quantity of the reducing agent based on the determined quality of the reducing agent; and
      apply the adapted metered quantity for removing nitrogen oxide.

7. The device according to claim 6, wherein the control system comprises a CAN-bus system for transmitting the service life of the internal combustion engine to a diagnostics system.

8. The device according to claim 7, wherein the diagnostics system is integrated in an SCR-control unit.

9. The device according to claim 8, wherein the device is part of an on-board diagnostics system.

10. The device according to claim 6, wherein the control system is configured to determine the quality of the reducing agent based at least on (a) the determined service life of the engine and (b) a detected fill level of the reducing agent in the at least one reservoir.

11. The device according to claim 6, wherein the control system is configured to determine the quality of the reducing agent based at least on (a) the determined service life of the engine and (b) a series of ambient temperature measurements taken over the service life of the engine.

12. The device according to claim 6, wherein the control system is configured to determine the quality of the reducing agent based at least on (a) the determined service life of the engine and (b) a measured temperature of the reducing agent in the at least one reservoir.

13. The method according to claim 1, further comprising:
   a return line for returning reducing agent used in the SCR-exhaust gas after-treatment system back into the at least one reservoir;
   a sensor configured to detect a heating of the stored reducing agent resulting from the return of the reducing agent into the at least one reservoir; and
   wherein the control system is configured to determine the quality of the reducing agent based at least on (a) the determined service life of the engine and (b) the detected heating of the reducing agent.

14. A motor vehicle comprising:
   an internal combustion engine; and
   an SCR-exhaust gas after-treatment system operably coupled to the internal combustion engine, the SCR-exhaust gas after-treatment system including:
      a control system configured to:
         determine a service life of the engine using a time detection device;
         determine a quality of the reducing agent based on the determined service life of the engine, the determined quality of the reducing agent indicating a possibly occurring deviation from a desired composition of the reducing agent; and
      a metering device configured to:
         selectively adapt a metered quantity of the reducing agent based on the determined quality of the reducing agent; and
         apply the adapted metered quantity for removing nitrogen oxide.

* * * * *